United States Patent Office 3,469,281
Patented Sept. 30, 1969

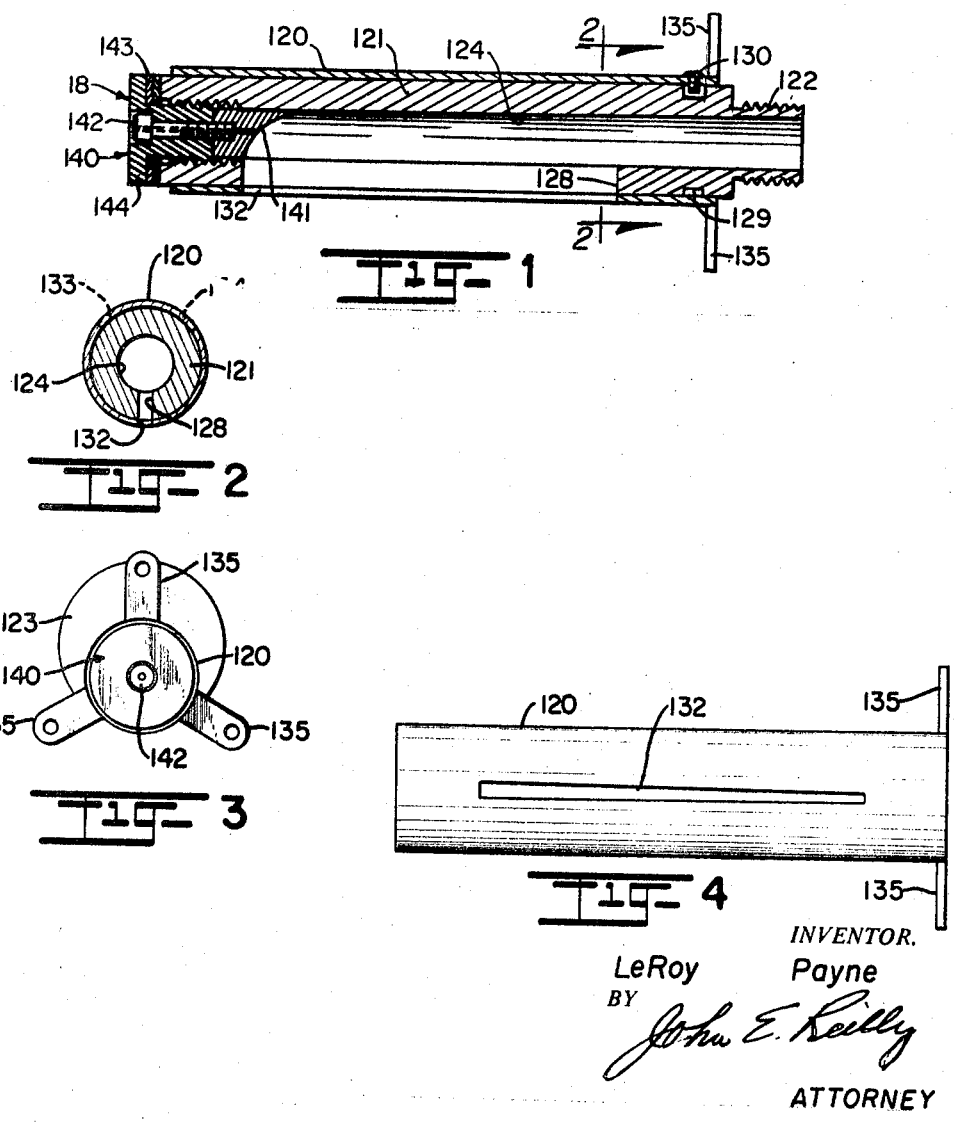

3,469,281
METHOD AND APPARATUS FOR EXTRUDING AND APPLYING PLASTIC MATERIALS
Le Roy Payne, Arvado, Colo., assignor, by mesne assignments, to Weyerhaeuser Company, Tacoma, Wash., a corporation of Washington
Filed Sept. 10, 1965, Ser. No. 486,511
Int. Cl. B29f 3/01
U.S. Cl. 18—12          2 Claims

ABSTRACT OF THE DISCLOSURE

An extrusion die having a sleeve with an elongated discharge opening. A rotatable housing on the sleeve includes a control slot which may be rotated into registry with the discharge opening. The slot increases progressively in width away from the opening to the extrusion die.

---

The present invention relates to the extrusion and application of viscous liquid or plastic materials; and, more particularly, relates to a novel and improved apparatus for extruding and applying curable plastic or liquefiable materials in uniform layers of predetermined width and thickness to relatively flat surfaces.

A number of the plastic materials can be advantageously used as protective and decorative coatings for surfaces, such as, for instance the floor and wall surfaces of a building, or as a coating layer for building blocks, masonry, tile and the like.

It is another object of the present invention to provide a novel and improved means for coating flat surfaces which will enable continuous formation and extrusion of plastic or liquefiable materials of different viscosities and properties including plastic-solid and solid formulations in a moderate sized apparatus for applications of predetermined width and thickness over large cross-sectional areas.

It is still another object of the present invention to provide in an extrusion apparatus for a novel and improved form of extrusion die to effect discharge either continuously or intermittently of a narrow stream of a viscous liquid or plastic material, the die head being adjustable such that the length and width of the material discharged are independently variable over a wide range according to the desired width and thickness of coating; moreover, wherein the die will permit positive cut-off or periodic interruption of flow of the material for application at predetermined spaced intervals to a series of surfaces to be coated.

It is a still further object of the present invention to provide for a method of coating relatively flat surfaces of masonry construction, such as, building blocks, tile and the like in which the ingredients selected to comprise the coating material are discharged through a restricted delivery slot in the form of an elongated narrow stream onto the surface to be coated; and the method being further characterized by enabling periodic interruption and positive cut-off of the material passing through the control slot without interrupting the continuous mixing and extrusion of the material.

In accordance with a preferred embodiment of the present invention, an improved method and apparatus has been devised for coating surfaces with virtually any viscous liquid, molten or plastic material. The apparatus is characterized in particular by its ability to extrude heavily-filled plastic materials, for example, heavily-filled polyester resins containing 60 to 90 percent by weight reinforcing fillers together with minor amounts of a curing agent. The extrusion die in turn has a series of control slots of different widths which are variable in length according to the specified width and thickness of the surface coating. Furthermore, the slots are so formed as to discharge the material in a relatively thin layer of uniform thickness continuously along the surface to be coated.

Moreover, the discharge head and control slot may be controlled to establish rapid, periodic cut-off of the material without interrupting continued operation of the extruder so that the material will not harden or set within the apparatus. In this relation, the extruder will permit internal buildup and accumulation of the material over a limited time period when the coating operation is interrupted without increase in pressure within the extruder and in such a way as to minimize lag time or delay between stopping and starting the coating process.

The above and other objects, advantages and features of the present invention will become more readily understood and appreciated from a consideration of the following detailed description when taken together with the accompanying drawings, in which:

FIGURE 1 is a sectional view of the extrusion die.
FIGURE 2 is a sectional view taken about line 2—2 of FIGURE 1.
FIGURE 3 is an end view of the die head; and
FIGURE 4 is a bottom view of the outer sleeve portion of the discharge head.

The extrusion die 18 is positioned at the leading or discharge end of the extruder cylinder to discharge the material in a layer of predetermined width and thickness onto each advancing block surface. Preferably, the head includes an outer rotatable housing defined by a relatively thin-walled sleeve 120 mounted in outer concentric relation to a stationary hollow valve body in the form of a relatively thick-walled tube 121 which is provided with a threaded end portion 122 for connection with an adaptor 123 at the leading end of the cylinder.

To control discharge of material from the extruder, the valve body 121 is provided with an elongated, axially directed discharge opening 128 extending the greater length of the body, and an external peripheral groove 129 on the body receives the inner end of a screw member 130 projecting through the housing 120 to support the housing in outer concentric, journaled relation to the sleeve. In turn, the outer housing is provided with a series of control slots 132, 133 and 134 at equal circumferentially spaced intervals about the housing and outwardly projecting ears 135 are disposed at equally spaced intervals intermediately between the outer control slots 132 to 134. The outer control slots 132 to 134 generally correspond in length with that of the opening 128 in the body with each of the outer control slots being of a different width so that one of the outer control slots may be advanced into alignment with the control opening 128 to determine the thickness of the layer discharged from the head. In addition, the ears permit connection of a cut-off solenoid having a control link pivotally connected to one of the ears 135 so that by energizing the solenoid the link will be withdrawn in a direction to rotate the outer control slot away from alignment with the discharge opening 128 thereby interrupting discharge of material through the slot. The outer end of the valve body 121 is closed by an adjustable plug member 140 which has an inwardly tapered, downwardly curved surface 141 secured to the inner end of the plug by a vented cap screw 142. Adjusting rings or shims 143 are positioned between the enlarged end 144 of the plug and the outer end of the body so that the extent of inward projection of the inner surface 141 across the opening 128 can be varied to establish the desired width of surface layer. For example, by removing one or more rings the plug 140 may be inserted a greater distance through the sleeve thereby advancing the end surface 141 inwardly and reducing the width of the stream passing through the control opening 128 and slot 132 onto each block. Furthermore, the curvature of the end surface 141 will prevent accumulation of material within the outer end of the block, and any accumulation of air or gas within the plastic material will be permitted to escape outwardly through the vented cap screw, in order to minimize the formation of bubbles in discharging the material from the die.

In order to discharge the material uniformly throughout the length of the outer control slot and assure application of a layer of uniform thickness, each of the control slots 132 to 134 is preferably of progressively increased width in a direction away from the extrusion chamber and in this way compensates for increased pressure of the material toward the inner end which would otherwise cause the material to flow at a faster rate and a greater thickness from the inner end than from the outer end of the slot, as illustrated in FIGURE 4.

While there is shown and described preferred and alternate forms of the present invention, it is to be understood that various changes and modifications may be made in the combination, construction and arrangement of parts comprising the present invention as well as in the exact sequence of steps followed in practicing the method of the present invention without departing from the spirit and scope thereof, as described by the appended claims and any reasonable equivalents thereof.

What is claimed is:

1. An extrusion die for an extruder apparatus including an elongated extrusion chamber comprising a sleeve defining a coaxial extension of the extruder and provided with an elongated discharge opening formed lengthwise of said sleeve and aligned to extend parallel to the longitudinal axis of the chamber, a rotatable housing carried in journaled, outer concentric relation to said sleeve, said housing including at least one outer control slot therein being aligned for rotation into registry with the discharge opening and progressively increasing in width away from the extrusion chamber, and cut-off means for rotating said housing to advance the outer control slot into and out of registry with the discharge opening.

2. An extrusion die according to claim 1, said outer rotatable housing being provided with a series of control slots at spaced, circumferential intervals thereon, each of said control slots being of a different width and being movable into alignment with the discharge opening in said sleeve to control the thickness of material discharged from said extrusion die.

References Cited

UNITED STATES PATENTS

| | | | |
|---|---|---|---|
| 941,792 | 11/1909 | Meeker | 25—99 |
| 1,547,260 | 7/1925 | Nighthart. | |
| 2,369,359 | 2/1945 | MacWilliams et al. | |
| 2,504,205 | 4/1950 | King. | |
| 2,588,595 | 3/1952 | Warner. | |
| 2,679,215 | 5/1954 | Truesdell | 18—4 XR |
| 2,747,224 | 5/1956 | Goch et al. | 18—2 XR |
| 2,778,547 | 1/1957 | Atterby | 222—553 |
| 2,827,928 | 3/1958 | Guckel | 222—553 XR |
| 2,826,492 | 3/1958 | Morash. | |
| 2,972,359 | 2/1961 | Joukainen et al. | 18—12 XR |
| 2,982,995 | 5/1961 | Groleau. | |
| 3,135,019 | 6/1964 | Aichele. | |
| 3,164,860 | 1/1965 | Oxel. | |
| 3,238,565 | 3/1966 | Jacobs | 18—4C XR |
| 1,866,177 | 7/1932 | Schneer | 222—553 |
| 2,944,708 | 7/1960 | Smeaton | 222—553 |
| 3,006,512 | 10/1961 | Keathley et al. | 222—553 XR |

OTHER REFERENCES 1,003,469     1951     France.

WILLIAM J. STEPHENSON, Primary Examiner